United States Patent
Kaiser et al.

(10) Patent No.: US 7,569,796 B2
(45) Date of Patent: Aug. 4, 2009

(54) THERMAL CATALYTIC IGNITION SYSTEM FOR AIRBORNE APPLICATIONS

(75) Inventors: Mark Kaiser, Prospect Heights, IL (US); Russ Johnson, Elmhurst, IL (US); Mike S. Koerner, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 684 days.

(21) Appl. No.: 11/200,309

(22) Filed: Aug. 8, 2005

(65) Prior Publication Data

US 2007/0031303 A1   Feb. 8, 2007

(51) Int. Cl.
*F23Q 7/00* (2006.01)
*F42B 3/10* (2006.01)
*F41F 3/00* (2006.01)

(52) U.S. Cl. .................... 219/260; 102/202.5; 89/1.814

(58) Field of Classification Search ................ 219/260, 219/261, 262, 263, 264, 265, 266, 267, 268, 219/269, 270; 102/202–206; 89/1.814
See application file for complete search history.

(56) References Cited

U.S. PATENT DOCUMENTS

| | | | |
|---|---|---|---|
| 4,500,775 A | * | 2/1985 | Sangu et al. ................ 219/497 |
| 4,510,377 A | | 4/1985 | Merritt et al. |
| 4,925,386 A | * | 5/1990 | Donnelly et al. .............. 431/28 |
| 5,608,179 A | | 3/1997 | Voecks et al. |
| 6,244,036 B1 | | 6/2001 | Christie et al. |
| 6,769,241 B2 | | 8/2004 | Spanjers et al. |

OTHER PUBLICATIONS

Mike Koerner, "Recent Developments in Aircraft Emergency Power", symposium, American Institute of Aeronautics and Astronautics, 2000, Honeywell Corporation, Torrance, CA.

* cited by examiner

*Primary Examiner*—Daniel L Robinson
(74) *Attorney, Agent, or Firm*—Oral Caglar, Esq.

(57) ABSTRACT

A power source is provided for a resistive heating element that heats a catalyst bed of a reactor that receives a monopropellant fuel and reacts the fuel in the presence of the catalyst bed to provide hot gas driving a turbine. The power source is a capacitor that discharges its charge across the resistive heating element so that its temperature is elevated to a point where the reaction of the monopropellant fuel occurs. The power source may be used in airborne applications, such as emergency power systems for aircraft, where it is desirable to minimize the weight of the unit and to allow the unit to use safer monopropellant fuels.

17 Claims, 3 Drawing Sheets

THERMAL CATALYTIC IGNITION SYSTEM FOR AIRBORNE APPLICATIONS

BACKGROUND OF THE INVENTION

The present invention relates generally to the area of airborne power systems, and more particularly to an apparatus and method for the rapid reaction of monopropellant fuels in the presence of a catalyst bed to provide a hot gas for driving a turbine.

Modern day aircraft are generally provided with Emergency Power Unit (EPU) systems designed to provide power to other aircraft systems in the event of an engine failure. Such systems must be capable of ignition at temperatures as low as about −54° C. because of the environmental conditions within which the aircraft must operate. Although many different propellants have been considered for use in EPU systems, only two are currently being used, namely, either H-70 monopropellant or a bipropellant consisting of jet fuel and air. Although the term "ignition" may be commonly used to describe a reaction of either propellant, the term "ignition" in its strictest sense may be used to describe the initiation of an oxidation reaction, which does not apply to the reaction of a monopropellant in the presence of a catalyst. It is more accurate to say that the monopropellant is "reacted" or "decomposed", rather than ignited, and therefore the term "react" and its variants will be used to subsequently describe such interactions between a monopropellant and a catalyst, but the term "ignition" will be used descriptively for a general system for either oxidation, decomposition, or reaction of a fuel used as a propellant.

H-70 monopropellant is a mixture of about 70% hydrazine and 30% water. Hydrazine ($N_2H_4$) is flammable, explosive, and a strong reducing agent. It is also toxic and a suspected carcinogen. The handling of hydrazine requires specially trained technicians with protective garments and special breathing apparatus; remote storage and handling facilities; contamination monitors; and special logistics. Ignition within hydrazine-based systems is accomplished by a rapid decomposition of the fuel in the presence of an iridium based catalyst.

Other EPU systems are powered by jet fuel systems in which the fuel is thermally reacted with air as the oxidizer. To ensure fast startup and operation at any altitude, the air for these systems must be carried in high-pressure storage bottles. However, because the density of the fuel and air storage is relatively low, such jet fuel and air systems require a greater volume to meet a given duty cycle than hydrazine-based systems. Jet fuel and air systems also tend to impose a greater weight penalty for airborne systems due to the added weight of the air storage vessels.

Other fuels have been proposed for EPU systems, such as fuels containing hydroxylammonium nitrate (HAN), which can be reacted by a catalyst. However, current catalyst formulations do not perform well at temperatures as low as about −54° C. and are unable to achieve reaction of the fuel without auxiliary heating of the catalyst bed. A catalyst alone is unable to achieve catalyst decomposition at these temperatures, and the catalytic bed must be heated to a range capable of supporting such catalytic decomposition of the fuel. This auxiliary heating requires additional energy over hydrazine-based systems, which in turn complicates ignition system design.

The prior art is replete with examples of catalytic reactors through which a monopropellant is directed, so that the monopropellant reacts in the presence of the catalyst to produce a hot gas that drives the turbine of a generator. FIG. 1 shows a typical emergency power system 100 according to the prior art. The emergency power system 100 may be powered by combustion of a monopropellant 121 to provide up to about 55 output shaft horsepower for driving both an electric generator 105 and a hydraulic pump 110 for up to about 10 minutes. The system 100 may also operate on engine bleed air 115 for driving the electric generator 105 and hydraulic pump 110 for a period of up to five hours. The emergency power system 100 may start within three seconds of when ignition is initiated and can operate anywhere within the aircraft flight envelope. According to FIG. 1, the monopropellant 121 may be stored in a fuel supply tank 120 that has been pressurized by a nitrogen bottle 125 through a series of nitrogen control valves 126. The nitrogen bottle 125 may be constructed of a lightweight material such as Kevlar and may contain nitrogen 127 that is used to expel the monopropellant 121 from the fuel supply tank 120. The nitrogen control valves 126 may initiate the flow of nitrogen 127 from the nitrogen bottle 125 into the fuel supply tank 120 and may therefore serve to regulate pressure in the fuel supply tank 120. The fuel supply tank 120 may typically be a piston type, positive expulsion tank that is sealed with a burst disc. When pressurized with nitrogen 127, the burst disc ruptures and the monopropellant 121 serving as the fuel for a catalytic reaction may be expelled from the fuel supply tank 120.

The monopropellant 121 may be directed from the fuel supply tank 120, through a fuel shutoff valve 130 and a fuel control valve 131, to a reactor 135. The fuel shutoff valve 130 and fuel control valve 131 may be operationally connected to an electronic controller 140 in a feedback arrangement well known to the industry in order to maintain a turbine 145 at a specified speed. The electronic controller 140 may provide control signals to the nitrogen control valves 126, the fuel shutoff valve 130, the fuel control valve 131, and the engine bleed air control valve 116 in response to aircraft and speed sensor inputs. The reactor 135 may contain a catalyst bed made up of a catalyst, such as an iridium based catalyst. One such iridium based catalyst that may be used in this application, previously known in the art as Shell 405, is currently known as 405 catalyst. The catalyst bed reacts with the monopropellant 121 to form a hot gas 136, which in turn drives turbine 145. The turbine 145 may be in the form of an axial impulse wheel which converts hot gas 136 into torque. The turbine 145 may be driven either by hot gas 136 from reactor 135 or by engine bleed air 115. An engine bleed air control valve 116, under the control of the electronic controller 140, may meter the flow of engine bleed air 115 to the turbine 145. A gearbox 150 may be connected to a shaft of the turbine 145 so as to reduce the turbine shaft speed and provide mounting for the hydraulic pump 110 and electric generator 105.

In the operation of such an emergency power system 100, the monopropellant 121 may be directed across the catalyst bed within the catalytic reactor where catalytic interaction between the monopropellant 121 and the catalyst reacts the monopropellant 121 to produce a stream of hot gas 136. In such systems, the monopropellant 121 must be reacted rapidly to prevent undue deterioration of the catalyst bed. The environment in which such systems are employed has a temperature as low as about −54° C., but the reaction of such monopropellants 121 typically occurs in the temperature range of from about 60° C. to about 80° C. This necessitates the use of a highly reactive fuel, a highly reactive catalyst bed, or both.

U.S. Pat. No. 5,608,179 discloses an ignition system for a regenerative propellant gun, where a liquid propellant is sprayed upon and passed through a heated catalyst bed so that smooth combustion of the liquid propellant drives a projectile from the barrel of the gun. The liquid propellant is reacted by passing it through a catalytic substrate that has been heated by applying a DC power source to an inner and outer electrode. The substrate is comprised of a high temperature alloy which defines an electric resistance heater so that a difference in potential between the inner and outer electrodes will heat the substrate to assist in igniting the fuel. The DC power source is described in FIGS. 1, 3, and 4 of the U.S. Pat. No. 5,608,179 patent as a DC generator or a battery.

U.S. Pat. No. 4,510,377 discloses a catalyst bed heater used for a satellite thruster. The heater comprises a double wound, helical heating element wound about a mandrel and inserted into a split insulating ring. The method for powering the catalyst bed heater is not disclosed.

U.S. Pat. No. 6,769,241 discloses a micro pulsed plasma thruster for satellite use. The device uses a capacitive discharge system to generate 1500 V. electrical pulses for a spark plug which causes an arc across the face of a Teflon rod, thus vaporizing a portion of the rod into a high-temperature ionized plasma to provide thrust. A second capacitive discharge system creates a 600 V. trigger to initiate the 1500 V. pulse. However, a capacitive discharge system of this kind is not used to heat a catalytic bed but is used to vaporize a fuel source, and thus would not be useful in igniting a monopropellant.

In order to operate a catalytic ignition EPU system in environments having temperatures of 80° C. or below, it is necessary to use a highly reactive catalyst containing noble metals such as platinum or iridium, which are expensive. Alternatively, a less reactive catalyst may be used, but this requires a highly reactive fuel such as hydrazine for the desired reaction; hydrazine is both highly reactive and toxic.

As can be seen, there is a need for an ignition system that can cause the reaction of a monopropellant at low temperatures for airborne power applications, without incurring a significant weight penalty. This would allow less reactive monopropellants to be used with less reactive and less expensive catalysts, and thus promote safety in the handling of the fuel.

SUMMARY OF THE INVENTION

In one aspect of the invention, an ignition apparatus is provided for promoting the reaction of a monopropellant that is passed over a catalyst bed, where the catalyst bed is associated with a resistive heating element. The ignition apparatus comprises a capacitor with a charge, the capacitor being arranged to discharge the charge across the resistive heating element and the charge being sufficient to heat the resistive heating element to a selected temperature for a selected duration of time, such that the monopropellant reacts when passed over the catalyst bed for the selected duration of time.

In another aspect of the invention, an ignition apparatus is provided for promoting the reaction of a monopropellant that is passed over a catalyst bed having a first portion and a second portion. The ignition apparatus comprises a resistive heating element with a resistance, the resistive heating element being associated with the first portion of the catalyst bed; and a capacitor having sufficient capacity to hold a charge, the capacitor arranged to discharge the charge across the resistive heating element, with the resistance and the charge chosen to maintain the resistive heating element at a selected temperature for a selected duration of time. This apparatus causes the monopropellant to react when passed over the first portion of the catalyst bedfor the selected duration of time.

In still another aspect of the invention, a thermal ignition system is provided for igniting a monopropellant to produce a hot gas. The system comprises a reactor with a catalyst bed, where the catalyst bed has a first portion and a second portion and the monopropellant is directed across the first portion and the second portion; a resistive heating element associated with the first portion; and a power source providing current to the resistive heating element. This arrangement allows the temperature of the first region to be elevated and the reaction of the monopropellant to occur over the first portion before the reaction of the monopropellant over the second portion.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention may find application in the area of airborne emergency power systems, where the system may be powered by a monopropellant fuel that may be reacted by catalytic action in a catalytic reactor. The invention may be used when a loss of power may necessitate the rapid initiation of an EPU in airborne applications where weight and operation under low temperature conditions are a consideration. The invention may find additional application as orbital alignment thrusters for use in satellites or spacecraft.

The environment in which such systems must operate has a temperature as low as about −54° C., but the reaction of such monopropellants typically occurs in the temperature range of from about 60° C. to about 80° C. Previously, either a highly reactive monopropellant, a highly reactive catalyst bed, or both were used to facilitate rapid reaction of the monopropellant within such an environment. The invention allows safer monopropellants and less expensive catalysts to be used by providing a resistive heating element that may be incorporated within a portion of the catalyst bed. When a current is applied to the resistive heating element, the temperature of the portion of the catalyst bed is elevated to the point where the reaction will occur, depending upon the choice of monopropellant. Since this current will be required only when the EPU is needed to generate power, a storage mechanism must be provided, which can supply enough power to heat the catalyst bed in case other power systems within the aircraft are compromised. Since the storage mechanism is required to be as light as possible while still being capable of supplying sufficient current to raise the temperature of the catalytic bed, the invention may provide as a power source a capacitor rather than a battery to store power when the aircraft is operational and to deliver power to the resistive heating element to heat the catalyst under emergency conditions. A capacitor has significantly less weight than a battery and is generally constructed of non-hazardous materials.

Figure 2:
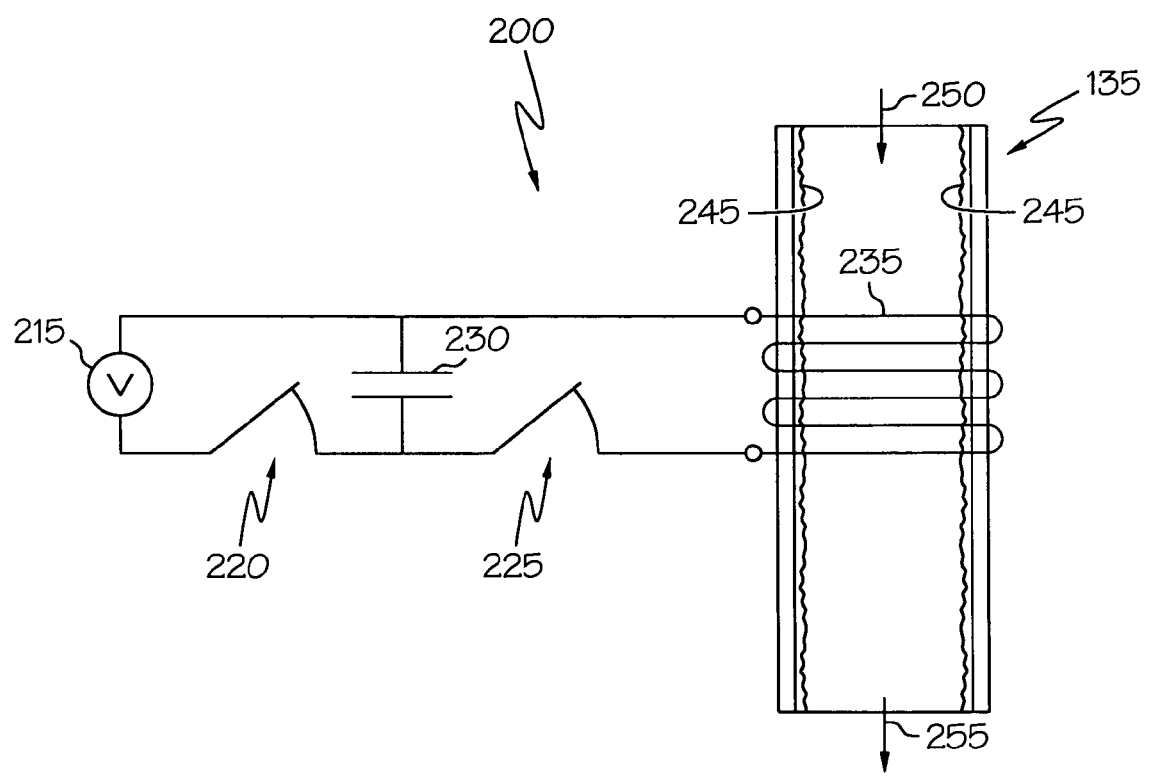
FIG. 2 shows a schematic diagram of a thermal ignition system for an emergency power system, according to an embodiment of the invention.

Referring now to FIG. 2, reactor 135 is shown with an associated ignition system 200 according to the present invention. The reactor 135 may receive a flow of a monopropellant 250, which may be reacted by contact with a catalyst bed 245 therein to produce a stream of hot gas 255. The monopropellant 250 typically used in such applications may be H-70 monopropellant, which is a blend of 70% hydrazine ($N_2H_4$) and 30% water, but the invention may permit the use of other monopropellants that are less dangerous, such as hydroxylammonium nitrate (HAN), triethanolammonium nitrate (TEAN), methanol or any combination thereof.

The monopropellant 250 may be reacted by catalytic action with a catalyst bed 245 within the reactor 135. The catalyst may typically be a composition known in the industry as 405, consisting primarily of iridium, but other catalytic compositions may be used without departing from the scope of the invention. As shown in the embodiment of FIG. 2, the catalyst bed 245 may be a coating along the walls of the reactor 135. It should be understood, however, that any means by which the catalyst bed 245 may be brought into contact with the propellant 250 may be used without departing from the scope of the invention. A resistive element 235 may be associated with a portion of the catalyst bed 245 that may not comprise the entire catalyst bed 245. The resistive element 235 may also be associated with the entire catalyst bed 245 without departing from the scope of the invention, in which case any portion of the catalyst bed 245 would considered to be identical with any other portion of the catalyst bed 245, in that each identifiable portion would contain catalyst and a resistive element 235. The resistive element 235 may also be independent of the catalyst bed 245, a form of support for the catalyst bed 245, or potentially, the catalyst itself; any method or means for associating a resistive element 235 with a portion of the catalyst bed 245 may be used without departing from the scope of the invention.

Figure 1:
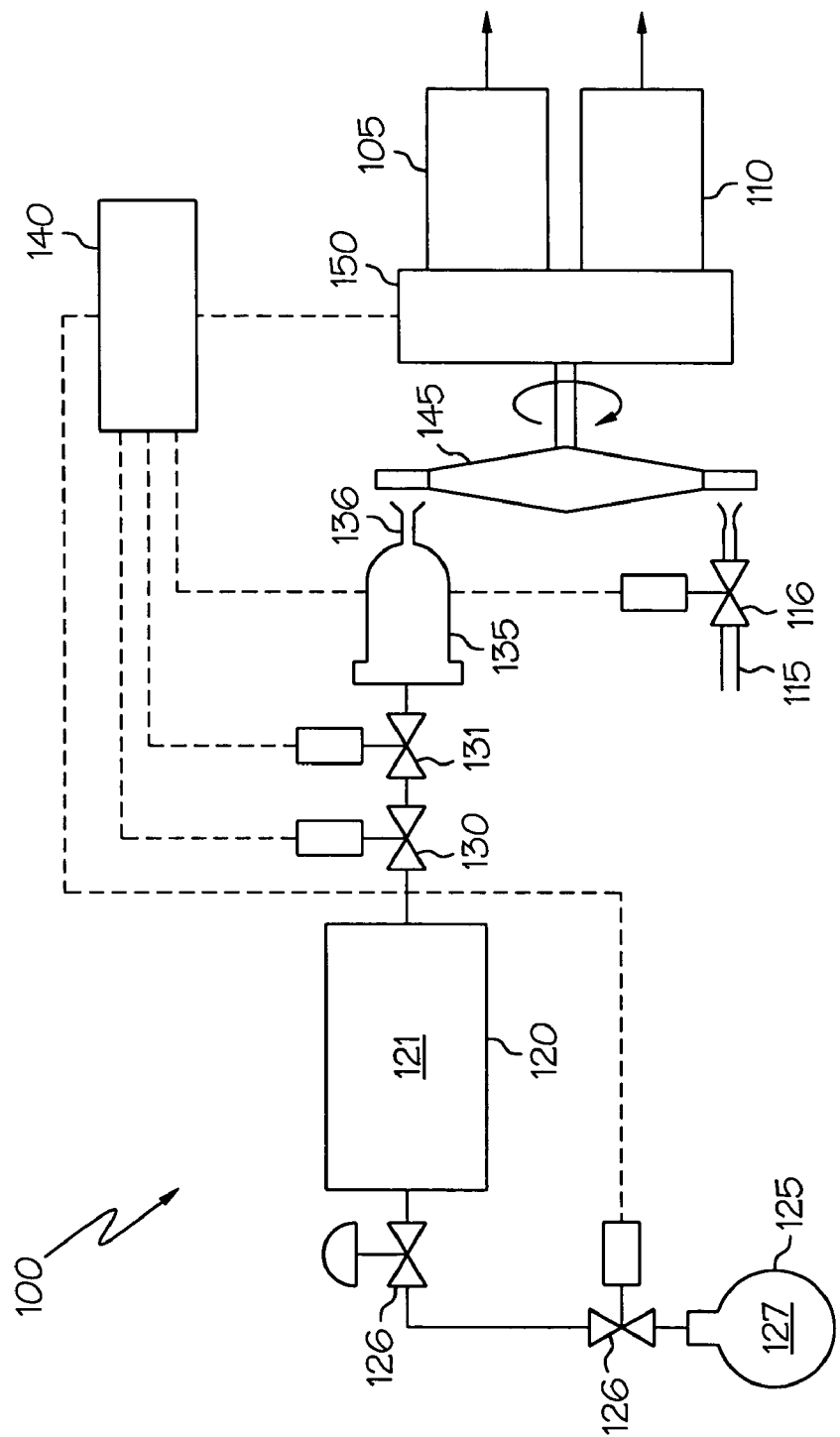
FIG. 1 shows a schematic diagram of a typical emergency power unit system, according to the prior art.

The ignition system 200 may comprise a voltage source 215, a capacitor 230, the resistive element 235, and switches 220, 225, where the switches 220, 225 may be under control of the controller 140 (FIG. 1). The ignition system 200 may have a charging mode and an operational mode. While in the charging mode, switch 220 may be closed and switch 225 may be open to allow the voltage source 215 to charge the capacitor 230. When in the operational mode, switch 220 may be opened and switch 225 may be closed, so that the capacitor 230 may serve as a power source and discharge across the resistive element 235 to provide sufficient heat to the portion of the catalyst bed 245 and aid the reaction of the monopropellant 250. This discharge by capacitor 230 may cause a rapid thermal increase of the portion of the catalyst bed 245 associated with resistive element 235. Once the catalyst bed 245, and thus the reactor 135, has reached a predetermined thermal point, the monopropellant 250 may be injected through the reactor 135 so that monopropellant 250 comes into contact with the now-heated catalyst bed 245, resulting in the rapid decomposition of the monopropellant 250. The hot gas 255 exhaust from reactor 135 may then be used in a manner similar to that of the conventional EPU design as it is passed into a turbine (FIG. 1).

Figure 3:
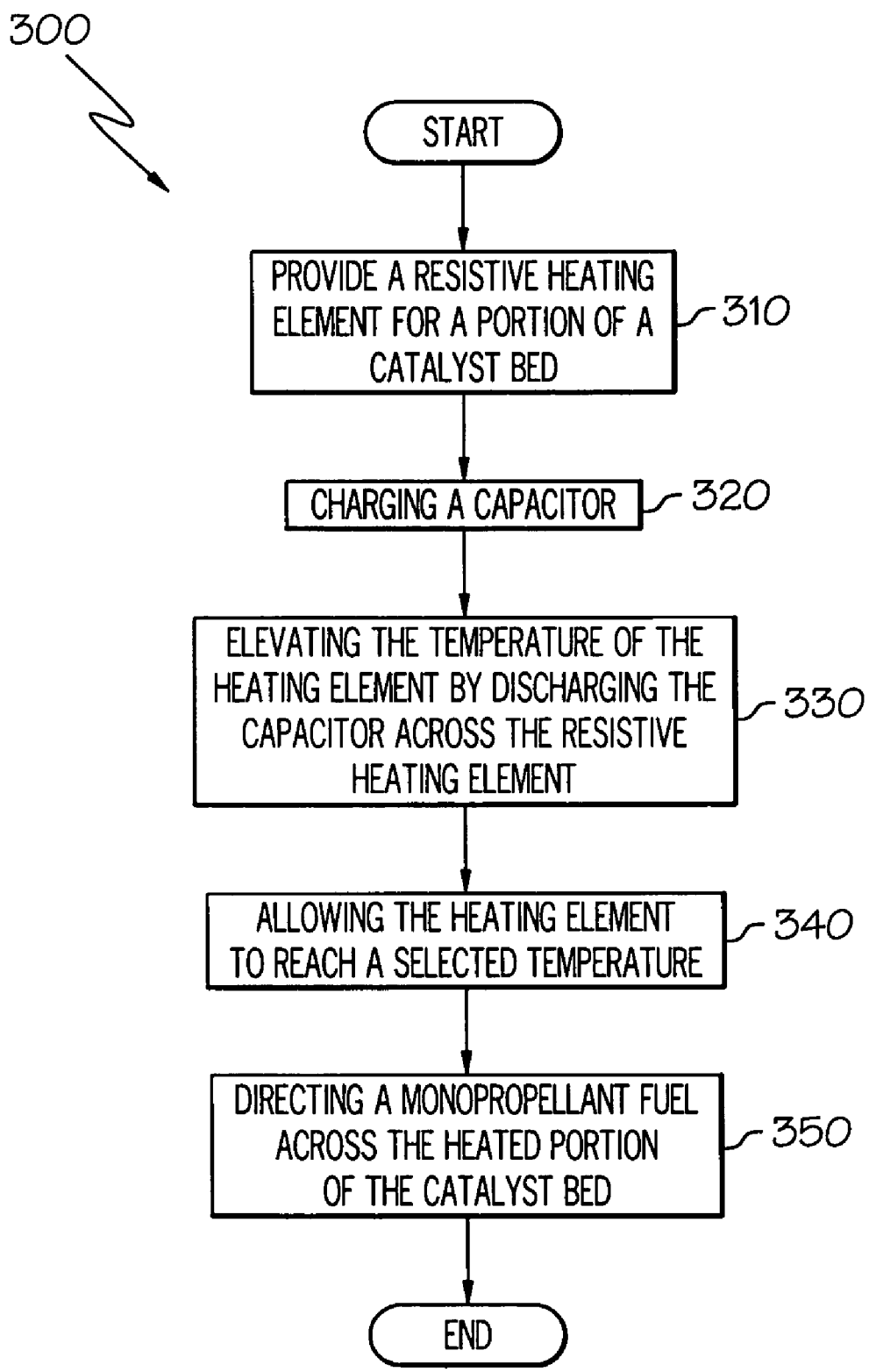
FIG. 3 shows a flow diagram of a method for igniting a monopropellant in the presence of a catalyst bed, according to an embodiment of the invention.

Referring now to FIG. 3, a method 300 of igniting a monopropellant in the presence of a catalyst bed is described. The method 300 may comprise a number of steps. A resistive heating element may be provided for a portion of the catalyst bed, according to block 310. The heating element may be associated with only a portion of the catalyst bed without providing heat for the entire bed, since it may only be necessary to initiate the reaction at a single point. A capacitor may then be charged with a charge, according to block 320. The temperature of the resistive element may then be elevated by discharging the charged capacitor across the resistive heating element, according to block 330. This discharge results in an electrical current being passed through the resistive heating element, which results in heat being generated. When the heating element has reached a selected temperature sufficient to react a monopropellant fuel in the presence of the catalyst bed, according to block 340, the monopropellant fuel may be directed across the catalyst bed to react the monopropellant into hot gas, according to block 350. Note that the size of the capacitor and the resistance of the resistive heating element may be selected to provide a time constant of suitable duration that would allow the discharge of the capacitor to maintain the temperature for the duration of time, which may be less than about 3 seconds.

It should be understood, of course, that the foregoing relates to preferred embodiments of the invention and that modifications may be made without departing from the spirit and scope of the invention as set forth in the following claims.

We claim:

1. An ignition apparatus for promoting the decomposition of a monopropellant, the apparatus comprising:
    a capacitor configured to charge to a selected charge;
    a resistive heating element in electrical communication with the capacitor, the resistive heating element being configured to heat up to a selected temperature for a selected duration of time in response to a discharge of the selected charge discharged from the capacitor across the resistive heating element;
    a catalyst bed associated with the resistive heating element, the catalyst bed comprising a catalyst configured to initiate decomposition of the monopropellant at the selected temperature;
    wherein the selected temperature is sufficient to decompose the monopropellant when the monopropellant is passed over the catalyst bed for the selected duration of time.

2. The ignition apparatus described in claim 1, wherein the selected duration is less than about 3 seconds.

3. The ignition apparatus described in claim 1, wherein the selected temperature is at least about 60° C.

4. The ignition apparatus described in claim 3, wherein the selected temperature is in a range of about 60° C. to about 80° C.

5. The ignition apparatus described in claim 1, wherein the catalyst bed has a first portion and a second portion, the resistive heating element is associated with the first portion of the catalyst bed, and the monopropellant passing over the first portion decomposes before the monopropellant passing over the second portion decomposes.

6. The ignition apparatus described in claim 1, wherein the monopropellant is selected from a group consisting of H-70 monopropellant, hydroxylammonium nitrate, triethanolammonium nitrate, and methanol.

7. The ignition apparatus described in claim 1, wherein the catalyst bed comprises iridium.

8. The ignition apparatus described in claim 1, wherein the catalyst bed comprises 405 catalyst.

9. An ignition apparatus for promoting the decomposition of a monopropellant that is passed over a catalyst bed having a first portion and a second portion, the apparatus comprising:
    a resistive heating element with a resistance, the resistive heating element being associated with the first portion of the catalyst bed;

the catalyst bed comprising the first and the second portion, the first portion of the catalyst bed comprising a catalyst configured to initiate decomposition of a monopropellant at a selected temperature;

a capacitor configured to have a capacity to hold a selected charge, the capacitor being configured to discharge the selected charge across the resistive heating element;

the resistive heating element being configured to heat the first portion of the catalyst bed to the selected temperature for a selected duration of time in response to the selected charge being discharged by the capacitor across the heating element;

wherein at least a portion of the monopropellant decomposes when passed over the first portion of the catalyst bed for the selected duration of time; and at least a portion of the monopropellant decomposes when passed over the second portion of the catalyst bed.

10. The ignition apparatus described in claim 9, wherein the duration is less than about 3 seconds.

11. The ignition apparatus described in claim 9, wherein the selected temperature is in a range of about 60° C. to about 80° C.

12. The ignition apparatus described in claim 9, wherein the first portion and the second portion are identical, wherein the resistive heating element is associated with all portions of the catalyst bed.

13. The ignition apparatus described in claim 9, wherein the decomposition of the monopropellant occurs over the first portion before the decomposition of the monopropellant occurs over the second portion when the resistive heating element is at the selected temperature.

14. The ignition apparatus described in claim 9 wherein the monopropellant is selected from a group consisting of H-70 monopropellant, hydroxylammonium nitrate, triethanolammonium nitrate, and methanol.

15. The ignition apparatus described in claim 9, wherein the catalyst bed comprises 405 catalyst.

16. The ignition apparatus described in claim 9, wherein the charge in the capacitor is stored in the capacitor without discharging the charge across the resistive heating element.

17. A method of decomposing a monopropellant in the presence of a catalyst bed comprising:

providing a resistive heating element;

providing a catalyst bed, the catalyst bed being in heat communication with the resistive heating element;

charging a capacitor to a selected charge;

discharging the capacitor across the resistive heating element, heating the resistive heating element;

heating at least a portion of the catalyst bed to a selected temperature for a selected duration of time with heat generated from the resistive heating element in response to the discharge from the capacitor;

feeding a monopropellant to contact the catalyst bed; and decomposing at least a portion of the monopropellant at the selected temperature within the selected duration of time.

\* \* \* \* \*